No. 895,176.

PATENTED AUG. 4, 1908.

T. F. GAYNOR.
ROTARY BUILDING.
APPLICATION FILED NOV. 8, 1904. RENEWED JAN. 3, 1908.

5 SHEETS—SHEET 1.

Witnesses

Inventor
Thomas F. Gaynor

No. 895,176. PATENTED AUG. 4, 1908.
T. F. GAYNOR.
ROTARY BUILDING.
APPLICATION FILED NOV. 8, 1904. RENEWED JAN. 3, 1908.

5 SHEETS—SHEET 2.

No. 895,176. PATENTED AUG. 4, 1908.
T. F. GAYNOR.
ROTARY BUILDING.
APPLICATION FILED NOV. 8, 1904. RENEWED JAN. 3, 1908.

5 SHEETS—SHEET 3.

Witnesses
Edward Rowland
George Smith

Inventor
Thomas F. Gaynor

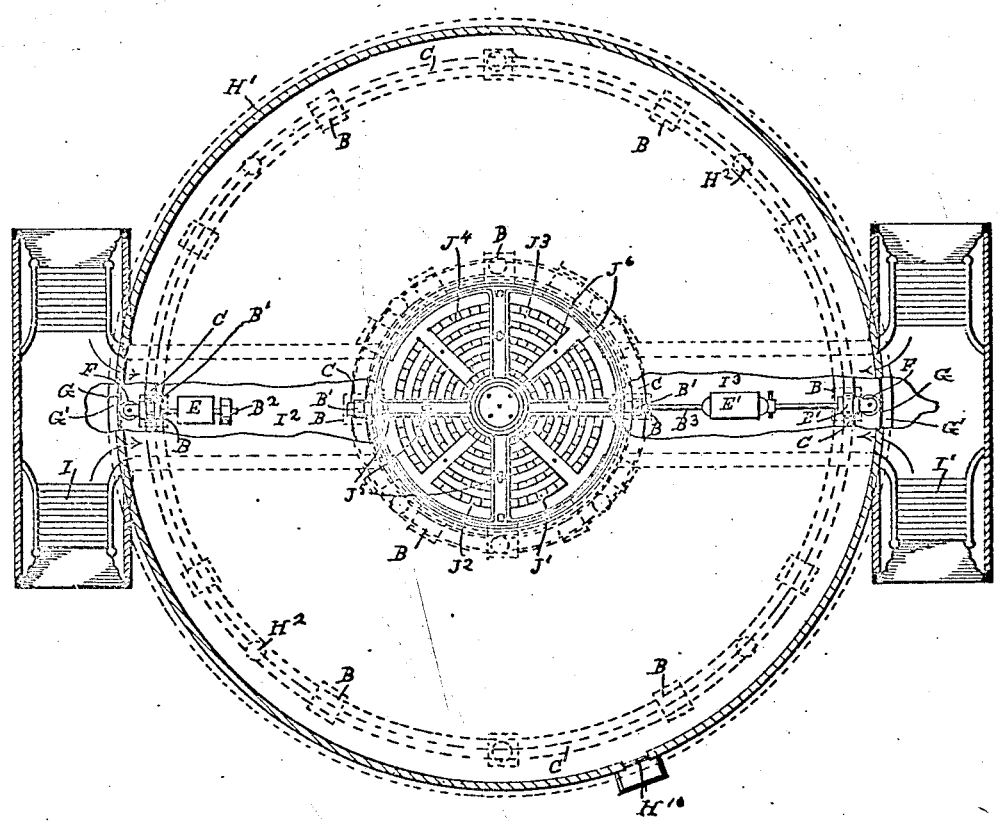

No. 895,176. PATENTED AUG. 4, 1908.
T. F. GAYNOR.
ROTARY BUILDING.
APPLICATION FILED NOV. 8, 1904. RENEWED JAN. 3, 1908.

5 SHEETS—SHEET 5.

WITNESSES:
Catherine M. Fitzgerald.
George G. Gaynor.

INVENTOR
Thomas F. Gaynor

UNITED STATES PATENT OFFICE.

THOMAS F. GAYNOR, OF NEW YORK, N. Y.

ROTARY BUILDING.

No. 895,176. Specification of Letters Patent. Patented Aug. 4, 1908.

Application filed November 8, 1904, Serial No. 231,944. Renewed January 3, 1908. Serial No. 409,238.

*To all whom it may concern:*

Be it known that I, THOMAS F. GAYNOR, a citizen of the United States, and a resident of Brooklyn borough, New York city, in the county of Kings and State of New York, have invented certain new and useful Improvements in Rotary Buildings, of which the following is a specification.

This invention relates to rotary buildings, and it consists in constructing a building with a rotary foundation provided with means for its rotation and its superstructure, the object being to provide a building with the advantages of the rotative principle as applied thereto. A dwelling house thus constructed, can be turned around at will, and any of its sides presented to the sunlight or shade, or any view of the landscape desired can be obtained from the interior, or the living or sleeping rooms can be presented to the sun or breeze or else away from cold winds or storms in the winter season.

For amusement or educational purposes, a building can be made with its exterior formed in the shape of a globe decorated to represent the earth, and the earth's axial rotation simulated to observers outside of it, while its interior can be used for panoramic or cycloramic views or objects, or any other purpose that may be desired. An endless variety of applications of this rotative principle of construction can be made with great advantage, but a rotary dwelling house and a rotary globe will be described in the following specification and illustrated in the accompanying drawings which are to be taken in connection herewith and which form a part of the specification, and in which similar letters refer to similar parts throughout the several views.

Figure 1:
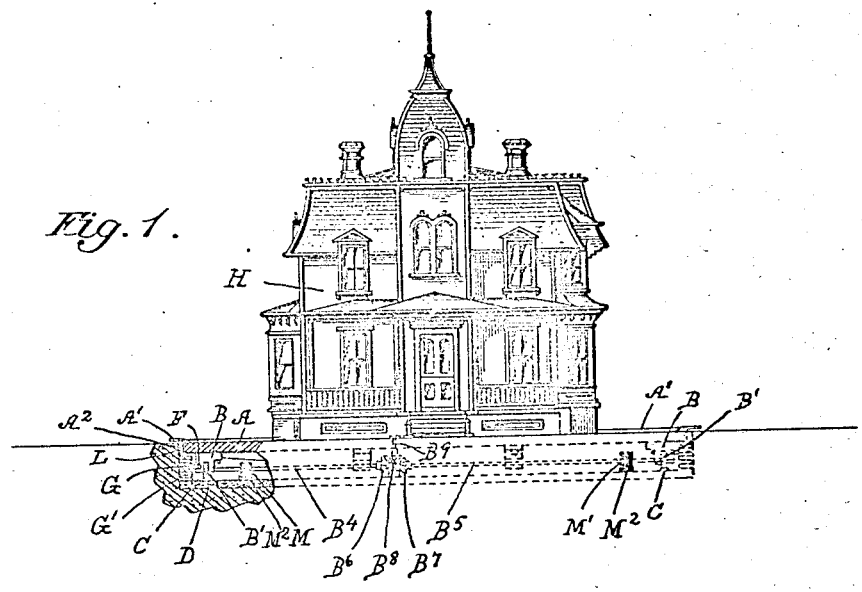
Figure 2:
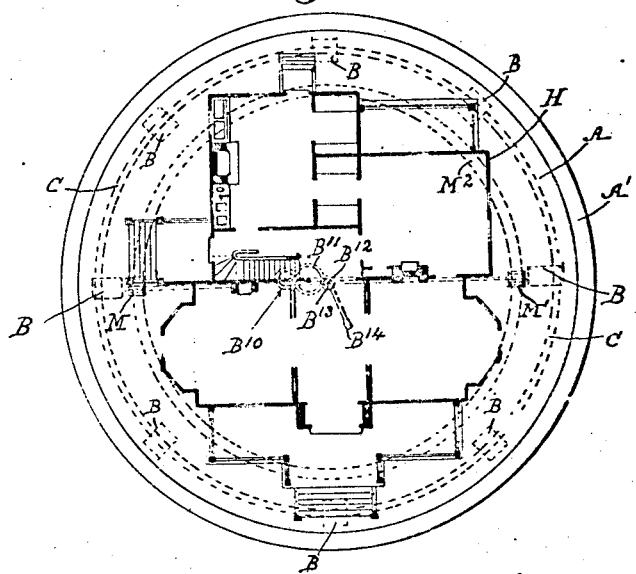
Figure 3:
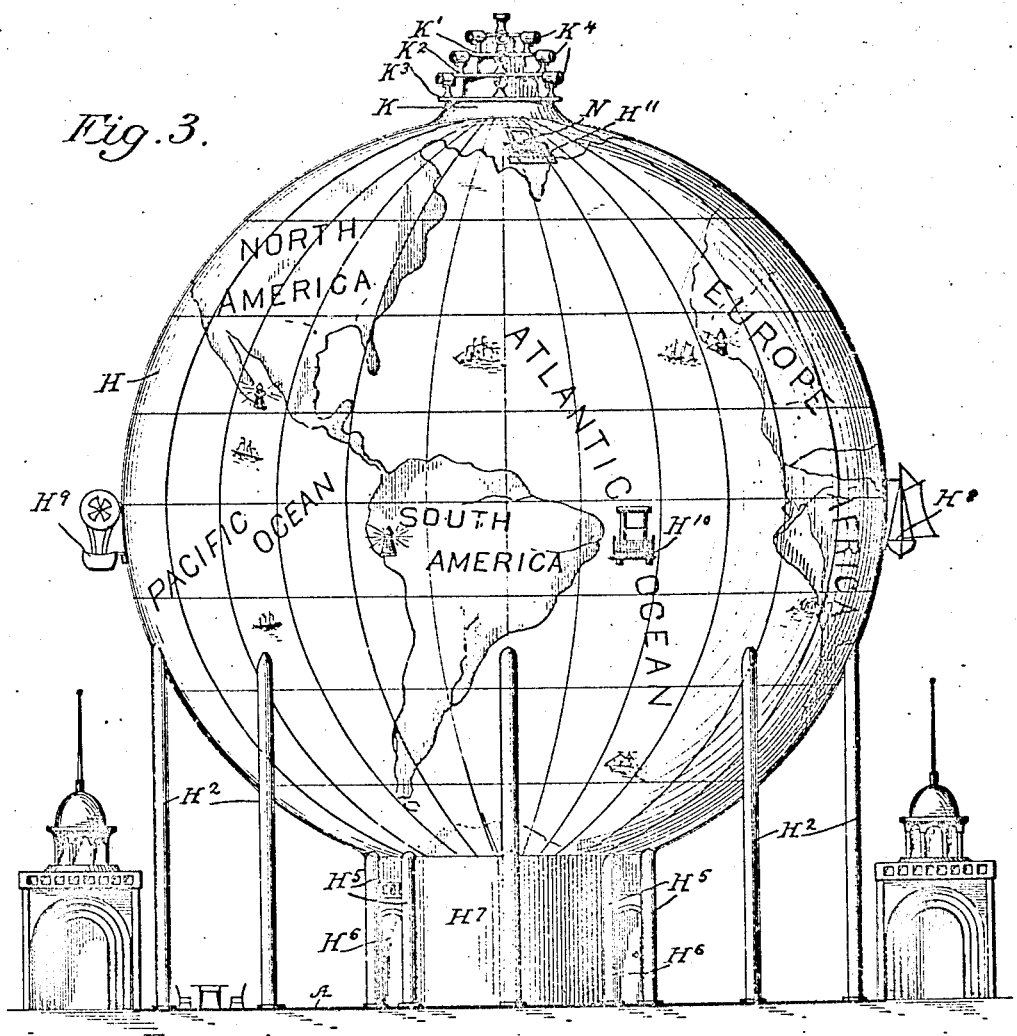
Figure 4:
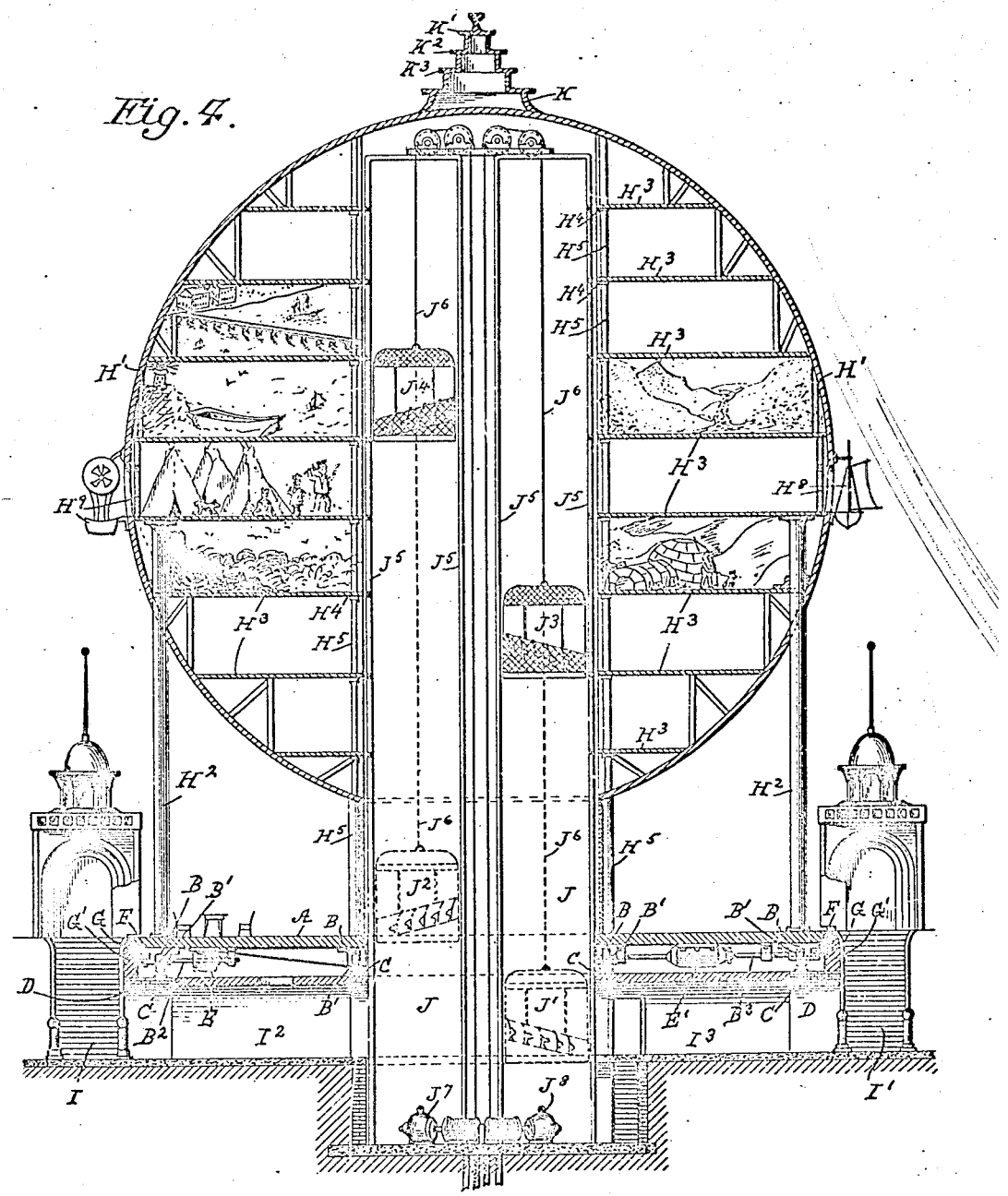
Figure 7:
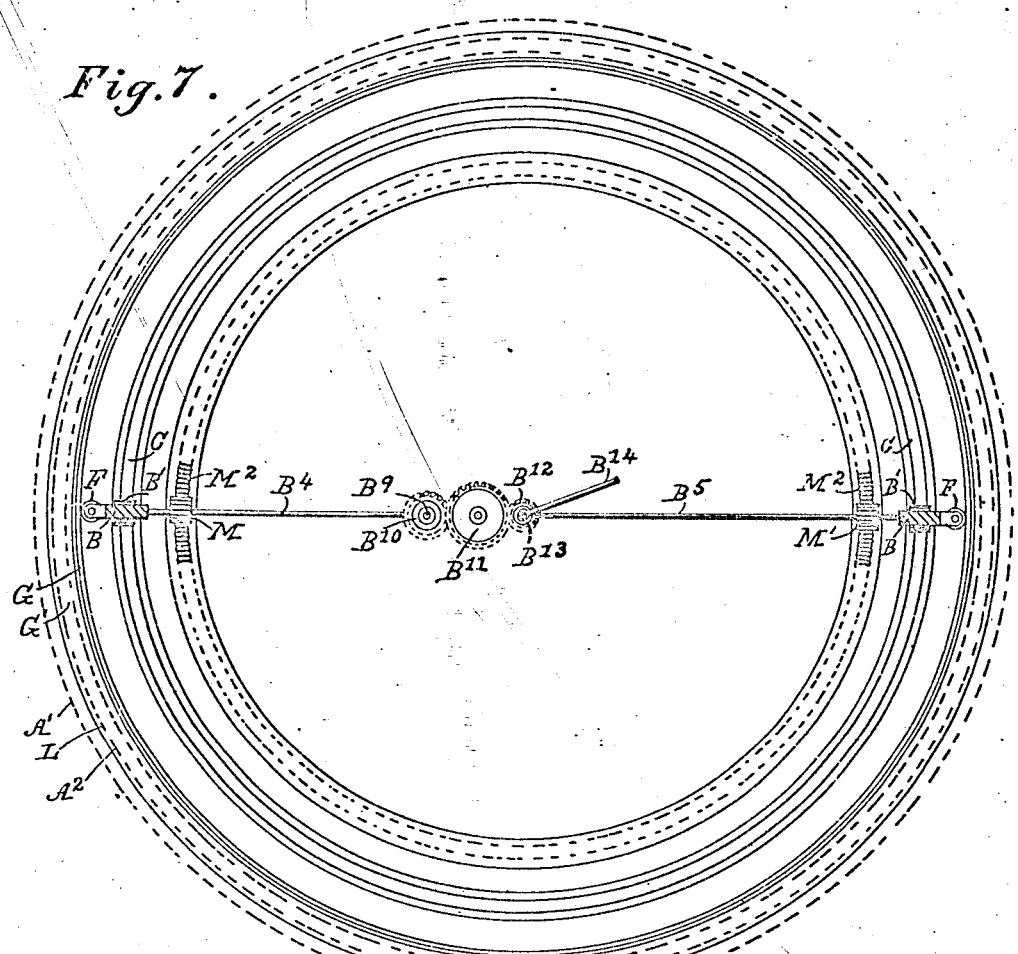
Figure 6:
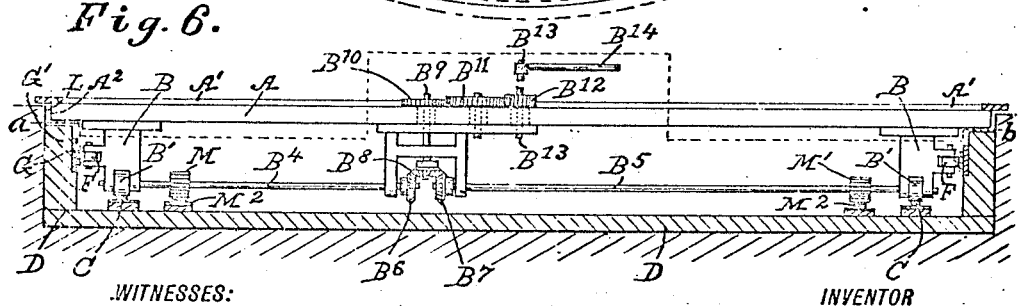

In the drawings:—Figure 1, represents a front elevation of a dwelling house constructed according to my invention, the foundation being partly in section and otherwise indicated in dotted lines that the rotative mechanism may be seen. Fig. 2, is a plan view of Fig. 1, on the ground floor plane. Fig. 3, is a front elevation of my invention made in the shape of a globe representing the earth and showing the means of its support from the ground and the kiosks over its entrance and exit to and from its interior which are below the ground level. This figure also shows an illuminating search light mechanism at the top of the globe to simulate the aurora borealis or "northern lights" phenomena, at night, by its proper operation when desired. Fig. 4, is a vertical section of Fig. 3, showing the interior floor construction, the elevator mechanism which carry the visitors to and from the several floors, and provided with seats if they are to remain in the cars and view the scenery therefrom. This figure shows the underground passages from the kiosks to and from the elevators, and the motor mechanisms and general arrangement of the foundation and foundation floor of the structure. It also shows panoramic and cycloramic scenes and objects upon some of the other floors. Fig. 5, is a horizontal section through the globe seen in Figs. 3 and 4, on the line of the equator and then through the walls of the kiosks that the plan of the structure may be understood. This figure also shows the plan of the elevator cars and the framework which supports and guides them in their operation. Fig. 6, is a front elevation, enlarged, of the foundation floor shafting and gearing mechanism, substantially as indicated in Figs. 1 and 2. Fig. 7, is a top or plan view of Fig. 6, approximately on the dotted line $a$—$b$, in the latter figure.

In the drawings:—A, represents the ground or foundation floor, provided with trucks, B, B, the wheels, B', B', of which, run upon a circular track, C, C, supported by the foundation, D, of the structure. The wheels, B', B', are geared through the shafts, $B^2$, $B^3$, with the motors, E, E', which are secured to the floor, A, and by means of which the floor is rotated around upon the track, C, C, and at a rate of speed determined by that of the motors and which can be controlled as all similar mechanisms are controlled. The floor, A, is also provided with guide wheels, F, F, trunnioned in the trucks, B, B, which run against the side rail, G, secured to the side wall, G'.

In Figs. 1, 2, 6 and 7 the shafts, $B^4$, $B^5$, have the bevel gears, $B^6$, $B^7$, secured thereto and which engage with the bevel gear, $B^8$, secured to the upright shaft, $B^9$, which has the spur gear, $B^{10}$, secured thereto which in turn through an intermediate gear, $B^{11}$, and a gear, $B^{12}$, secured to the rotating shaft, $B^{13}$, having the lever, $B^{14}$, and by means of which, the shaft, $B^{13}$, may be made to turn the wheels, C, C, through the intermediate gears and shafts, and thus rotate the floor, A, with all that the latter may sustain or be connected with. The lever, B¹⁴, can be moved by hand, and can be detachable from the rotating shaft, B¹³, as like a wrench, for instance, or an electric or other power motor can be substituted for the lever, or so connected to the shaft as to permit of the lever being used instead of the motor, whenever it is thought desirable to do so.

The superstructure, whether it be a house, H, a globe, H', or building of any other design or purpose, is erected upon the floor, A, just the same as it would be constructed if upon a stationary foundation in the ordinary manner of building construction, and therefore needing no special explanation. The globe building H' is shown as being supported by the columns, H², H², which rest upon the floor, A, and securely bolted or otherwise secured thereto, while their upper ends support the superstructure by its flooring and outer walls as seen in Fig. 4.

In the house form shown in Figs. 1 and 2, the building is, of course, entered by walking over the floor, A, as in that form of construction the building is supposed to be moved only intermittently or at such times as a new position is desired and to be maintained for an indefinite length of time. But in the globe form, H', the building is supposed to be in a state of rotation as its normal condition, therefore the interior of the structure is provided with the means of underground access consisting of the stairways, I, I', leading to the passage ways, I², I³, terminating at the elevator shaft, J, in which elevators, J', J², J³, J⁴, are arranged and by means of which access is had with the whole interior of the globe as in any ordinary building provided with an elevator system of passenger traffic. The elevator mechanism shown is of the usual construction and having the framework, J⁵, J⁵, and cables, J⁶, J⁶, connecting the cars, J', J², J³, J⁴, with motor mechanisms, at the bottom of the elevator shaft, J, and of which, two are shown at J⁷, J⁸. The elevator car starting connections are omitted from the drawings but which can be of any ordinary construction and can be understood without description. The floors, H³, H³, of the globe have the usual central opening therein for the elevator mechanism, as is in any building provided with elevators but with the important difference that the said floors are not joined at any point with the elevator framework, J⁶, J⁵, nor is any part of the superstructure or the foundation floor, A, connected with the elevator framework, as the latter is constructed so as to be independent of, and separate from the rest of the structure, that the latter may be free to rotate around the elevator structure without touching it, on account of its stationary condition. The inner edges, H⁴, H⁴, are supported however, by the inner short columns, H⁵, H⁵, to give the requisite stability to the floors, H³, H³, as in any similar building of stationary construction.

The elevator cars are in the shape of a quadrant, as seen in Fig. 5, to conform with the circular plan of the elevator shaft, but they can be of any other shape if desired as can also be the elevator framework itself if so preferred. By having the elevator mechanism include two or more cars in a building of this character, the passenger service can be divided in small units and the advantage of which can be understood. The elevators are shown as provided with seats that the spectators may be given a scenic trip up and down through the globe without leaving the cars, if so intended. The cars can also be stopped at any floor in the globe and thus allow the passengers to go upon the floors as in any stationary building, and while the globe is in motion, as the speed of the latter near the center portions can be slow enough to admit of this without danger to a person. While the interior of the globe can be reached by the underground passage ways described, it can also be reached through the openings, H⁶, H⁶, in the elevator inclosure, H⁷, between the bottom of the globe and the foundation floor, the visitor, of course, walking across the latter as upon the house design foundation floor. This would necessitate a little care in stepping upon the edge of the floor if the latter was in motion at the time, as is in the case of a person stepping upon an escalator or moving stairway, or the like. A moving sidewalk over the edge of the outer portion of the floor A, would practically obviate this objection if it was regarded as necessary. Openings can be made in the globe through which passengers could get into balconies representing boats, airships, and other objects, and seen at H⁸, H⁹, H¹⁰, H¹¹.

K, represents a revolving search light mechanism comprising rotatable platforms, K' K³, K³, and upon which the search lights, K⁴, K⁴, K⁴, are rotatably mounted. These devices are provided with suitable illuminating and rotating facilities so that rays of powerful lights of different colors can be projected in all directions and at all angles up to the zenith and thus give an illuminating effect in simulation of the "northern lights", the rays of light being interrupted by colored spectacles to give the intermittent wavy effect of the great phenomena of nature. If the current is interrupted (if the lighting is by electricity) a similar wavy intermittent effect can be obtained. The nature and construction of this novel search light mechanism will be more fully shown and described in another application for Letters Patent, which I intend to make therefor, at another time, so its further details of construction will be omitted from this specification. All kinds of objects can be placed upon the foundation floor and motion thus imparted to them with the general rotary effect, as can persons standing or seated on chairs thereon, be likewise carried around.

In Figs. 1, 2, 6 and 7 the edge of the foundation floor is shown as being provided with a threshold A', which is intended to cover the joint, L, between the floor edge A², and the side wall, G', and for the purpose of preventing snow or ice in winter obstructing the free operation of the mechanism. The rotating mechanism can be given a positive action by having the shafts, B⁴, B⁵, provided with spur gears M, M', which engage with the stationary rack, M², if desired.

The globe can be provided with openings as means of exit in case of an emergency, as can be understood, and an opening in the outer wall is shown at M, that the north pole illuminating mechanism can be reached and operated. Similar safety openings can be provided in other locations through the said wall, as well. The whole outer surface, map outlines of the continents, islands, and so forth, can be illuminated with electric lights as is usually done in decorative illumination. The globe can be made of metal or fire-proof construction. The other form of this invention can be of any ordinary material suitable for building purposes. The foundation floor is to be of the requisite strength to sustain the superstructure, and the motor mechanism properly proportioned to give the necessary rotative efficiency. The motor can be of electric construction and the starting mechanism in any part of the building most convenient to control the rotation of the structure. A clockwork arrangement can be connected with the motor mechanism so as to regulate the motion of the building according to the daily motion of the sun if that is desired.

It will be observed that by the form of construction herein shown and described, that there is no central vertical shaft or tube used upon which the structure is pivoted or journaled or hung, and as is a necessary member in rotating or revolving structures as usually constructed. This is very advantageous, as it allows the central portion of the structure to be unobstructed and so that it can be used for other purposes as shown in the drawings, and the roof portion is free from supporting braces and external suspension rods, such as are seen in merry-go-rounds, carousels, or like structures. This construction also leaves the view towards and from the superstructure, unobstructed, and necessitates considerably less ground space for its occupancy than other forms of construction in which guys or heavy braces are used to steady the top or upper parts of the structure and having ground foundations or connections located outside of its main base area. It also allows the elevation and general architectural design to be made without recognizing the rotative principle above the rotative foundation line, and thus be literally what it is herein designated, a rotary building, in the full sense of the term. It is to be understood, that the traction rack and gear mechanism seen in Figs. 1, 2, 6 and 7 can be reversed in their construction, that is, the rack can be secured to the foundation floor and the gears with their operating shaft mechanism can be mounted upon the fixed ground beneath, and be equally operative, and such an arrangement is to be the equivalent alternative of the form shown and described. The novel construction and arrangement of the search light mechanism approximately at the north pole of the form of construction shown in Figs. 3 and 4, is original in this invention, and is not merely for illuminating purposes, but is mainly intended to illustrate the beautiful "northern lights" of nature, and is to be regarded as an important element in combination with the globe representing the earth as it is in connection with the north pole of the design, and as the northern lights emanate from the north pole of the earth in the northern hemisphere, this whole device and arrangement, is highly instructive and appropriate in this connection. By "approximately", I mean at such point on the surface of the sphere as would admit of a search light throwing its rays up to and beyond the zenith.

It can thus be seen that I provide a complete rotating building that can be of any shape or construction and for various purposes of utility, and having a wide range of application and service, and one that is simple in construction, economical in cost of production and in every way adaptable to the objects intended for it. When the building is stationary, it is as good as any other stationary building of like dimensions, so that if the rotative feature is to be discontinued at any time, the building has all the advantages of a stationary structure.

The friction rollers between the rotatable foundation and the track support, have been referred to as "wheels", in the foregoing specification, but it is to be understood that any rolling equivalent such as small rollers, balls, or like rolling bearings, are intended to be used as may be preferred, and that the same will be included within the scope of this invention. The materials of which this invention are to be constructed, depend of course, upon the form of construction to be adopted, but they may be of wood, metal, or any other material usually employed in architectural structures, and as can be understood without further description.

Having thus described my invention, what I claim, and desire to secure by Letters Patent, is:—

1. A rotatable building mounted upon a foundation having a circular track support and provided with a side guide mechanism, substantially as described.

2. A rotatable building mounted upon a foundation having side guide mechanism by means of which the structure is maintained in a fixed vertical axial position while being rotatable in said position, substantially as described.

3. In a rotatable building, the combination of a globe shaped superstructure, a rotatable foundation, and means of access into and from the interior of the superstructure under and over the rotatable foundation, substantially as described.

4. In a rotatable building, the combination of a globe shaped superstructure representing the earth, a rotatable foundation, and supporting columns secured to the foundation and sustaining the superstructure in position and carrying the latter around with the foundation in a vertical axial motion, substantially as described.

5. A rotatable building having panoramic or cycloramic scenery or objects arranged within its interior so as to be moved around with the rotation of the superstructure, and a central elevator mechanism provided with vertically moving passenger car or cars, operating in a stationary framework and from which car or cars, the sights within may be viewed, substantially as described.

6. In a rotatable building, the combination of a rotatable structure having floors therein, and a stationary framed elevator mechanism around which the structure is rotatable and having a vertically moving car or cars, by means of which, passengers can be carried to and from the different floors, substantially as described.

7. In a rotatable building, the combination of a rotatable foundation, a track support, friction rollers between the foundation and the track support, a rotating shaft mechanism provided with means for its rotation and a gear or gears secured thereto, and a rack which the shaft gear mechanism engages with and thereby giving a positive traction means of rotation to the foundation, substantially as described.

8. In a rotatable building, the combination of a rotatable foundation, a track support, friction rollers between the foundation and the track support, a rotating shaft mechanism provided with means for its rotation and being connected with the rollers and thereby cause the rollers to roll around upon the track and thus give means of rotation to the foundation, and a side guide mechanism, substantially as described.

9. In a rotatable building, the combination of a rotatable foundation, a track support, friction rollers between the foundation and the track support, a rotating shaft mechanism provided with means for its rotation and being connected with the rollers and having a gear or gears secured thereto, and a rack which the shaft gear mechanism engages with and thereby giving a positive traction means of rotation to the foundation, substantially as described.

10. In a rotatable building, the combination of a rotatable foundation, a track support, friction rollers between the foundation and the track support, a rotating shaft mechanism comprising sections of which each has a driven gear connected thereto, and a driving shaft section with a driving gear attached thereto and which engages with said driven gears and through which traction power is transmitted to the shaft sections and the foundation thereby rotated, substantially as described.

11. In a rotatable building, the combination of a rotatable foundation, and a rotating shaft mechanism comprising the traction sections, $B^4$, $B^5$, having their respective gears, $B^6$, $B^7$, and the driving shaft $B^9$, with the driving gear, $B^8$, secured thereto, and which engages with the driven gears, $B^6$, $B^7$, and thereby imparts traction power to the traction sections, $B^4$, $B^5$, and thus rotates the foundation, substantially as described.

12. In a rotatable building, the combination of a rotatable foundation, a track support, a series of friction rollers between the foundation and the track support, and a rotating shaft mechanism comprising the driving shaft, $B^9$, having the driving gear, $B^8$, and a series of traction shaft sections each of which has a driven gear engaging with the driving gear, $B^8$, and each having a roller connected therewith and being provided with a traction gear, and a circular traction rack, $M^2$, for the traction gears of the traction sections to engage with, substantially as described.

13. In a rotatable building, the combination of a rotatable foundation, a track support, friction rollers between the foundation and the track support, a rotating shaft mechanism, and a side guide mechanism comprising the guide wheels, F, F, and the side guide rail, G, substantially as described.

14. In a rotatable building, the combination of a superstructure, a rotatable foundation, and means of access into and from the interior of the superstructure under and over the rotatable foundation, substantially as described.

Signed at New York city, in the county of New York, and State of New York, this 3rd day of November, A. D. 1904.

THOMAS F. GAYNOR.

Witnesses:
JAMES KITCHEN,
JAMES IRVINE.